United States Patent
Ho (10) Patent No.: US 7,327,127 B2
(45) Date of Patent: Feb. 5, 2008

(54) PULSE-FREQUENCY MODE DC-DC CONVERTER CIRCUIT

(75) Inventor: Daniel Ho, Palo Alto, CA (US)

(73) Assignee: VIA Technologies, Inc., Taipei (TW)

( * ) Notice: Subject to any disclaimer, the term of this patent is extended or adjusted under 35 U.S.C. 154(b) by 159 days.

(21) Appl. No.: 11/380,508

(22) Filed: Apr. 27, 2006

(65) Prior Publication Data

US 2007/0085520 A1   Apr. 19, 2007

Related U.S. Application Data

(60) Provisional application No. 60/595,236, filed on Jun. 17, 2005.

(51) Int. Cl.
*G05F 1/565* (2006.01)

(52) U.S. Cl. ...................... 323/271; 323/285

(58) Field of Classification Search ............... None
See application file for complete search history.

(56) References Cited

U.S. PATENT DOCUMENTS

| | | | |
|---|---|---|---|
| 5,481,178 A | | 1/1996 | Wilcox et al. |
| 5,731,694 A | | 3/1998 | Wilcox et al. |
| 5,808,455 A | * | 9/1998 | Schwartz et al. ........... 323/271 |
| 5,994,885 A | | 11/1999 | Wilcox et al. |
| 6,304,066 B1 | | 10/2001 | Wilcox et al. |
| 6,411,531 B1 | | 6/2002 | Nork et al. |
| 6,580,258 B2 | | 6/2003 | Wilcox et al. |
| 6,600,298 B2 | * | 7/2003 | McDonald et al. ......... 323/271 |
| 7,042,203 B2 | * | 5/2006 | Van Der Horn et al. .... 323/285 |
| 7,170,267 B1 | * | 1/2007 | McJimsey .................. 323/271 |
| 7,245,113 B2 | * | 7/2007 | Chen et al. ................. 323/271 |

* cited by examiner

*Primary Examiner*—Jeffrey Sterrett
(74) *Attorney, Agent, or Firm*—James W. Huffman; Tomas Kovacs (57) ABSTRACT

A step-down switching voltage regulator may operate in PFM mode based on peak current sense without requiring an external diode. The regulator may comprise a PMOS transistor and an NMOS transistor whose drains are coupled to a common output node and whose sources are coupled to high and low supply voltages, respectively, configured to develop a current in an inductor and generate an output voltage. A control circuit, coupled to the respective gates of the PMOS transistor and the NMOS transistor, may sense the current in the inductor ($I_L$), sense an attenuated version of the output voltage (VFB), and sense the polarity of the voltage (VX) developed at the common output node. The control circuit may turn on the PMOS transistor when the VFB falls below a reference voltage and VX remains positive with respect to the low supply voltage, and may turn off the PMOS transistor when $I_L$ reaches a specified value or when VFB exceeds the reference voltage. The control circuit may also turn on the NMOS transistor after the PMOS transistor is turned off and VX becomes negative with respect to the low supply voltage, and may turn off the NMOS transistor when VX becomes positive with respect to the low supply voltage.

18 Claims, 5 Drawing Sheets

PULSE-FREQUENCY MODE DC-DC CONVERTER CIRCUIT

This application claims benefit of priority of U.S. provisional application Ser. No. 60/595,236 titled "Pulse-Frequency Mode DC-DC Converter Circuit", filed Jun. 17, 2005.

BACKGROUND OF THE INVENTION

1. Field of the Invention

This invention relates to power converters in computer systems and digital systems, and more particularly to designing a DC-to-DC voltage converter.

2. Description of the Related Art

Figure 1:
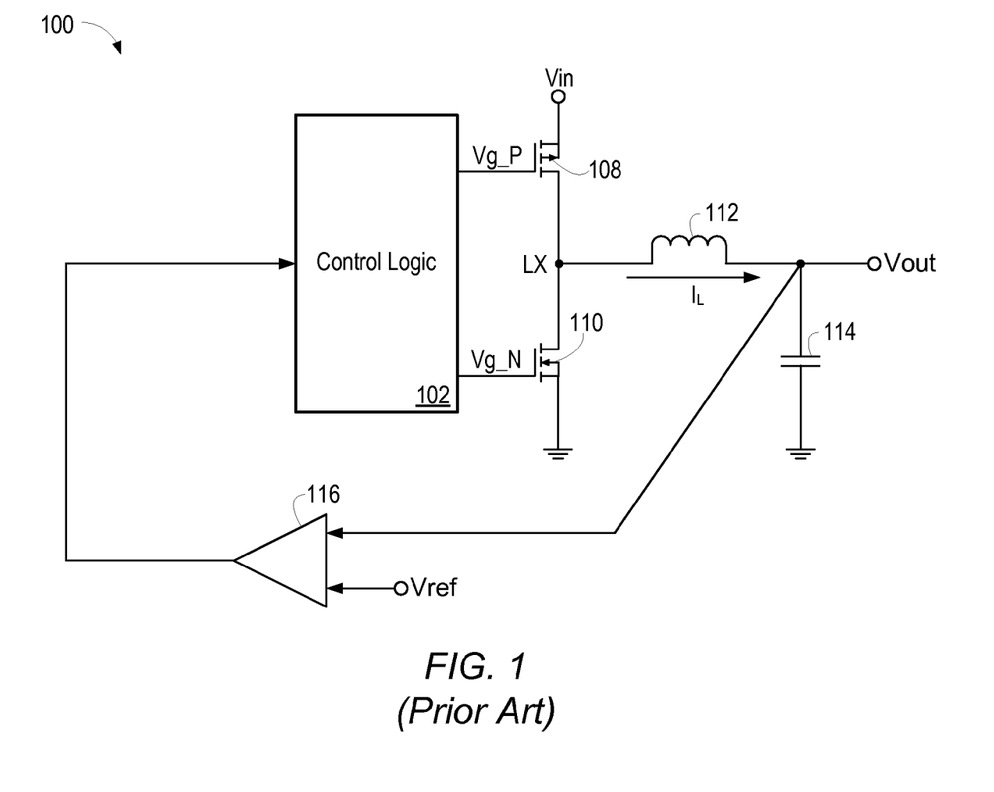
FIG. 1 shows one embodiment of a PWM mode DC-to-DC converter circuit according to prior art.

DC-to-DC conversion is often performed by having switching power regulators, or step-down regulators, converting a higher voltage (e.g. 12V) to a lower value as required by one or more load devices. A common architecture features distribution of the higher voltage to multiple power regulators, each producing a different (or possibly the same) voltage to one or more loads. Switching power regulators often use two or more power transistors to convert energy at one voltage to another voltage. One common example of such a power regulator, commonly called a "Buck regulator", implemented with MOS devices is shown in FIG. 1. Buck regulator 100 may be configured to operate in the PWM mode, switching a P-channel device 108 and an N-channel device 110 in order to produce a square-wave at their common node LX. The produced square-wave can be smoothed out using an LC circuit comprising inductor 112 and capacitor 114 to produce the desired voltage, Vout. A control loop, comprised of an error amplifier 116 and a Control Logic block 102 can be configured to control the duty-cycle of the output square-wave, thereby controlling switching P-channel device 108 and N-channel device 110, and hence the resulting value of Vout. In general, transistors 108 and 110 are controlled such that they do not conduct current at the same time. Typically, when transistor 108 is turned on (Vg_P is logic 0), transistor 110 is turned off (Vg_N is logic 0), and when transistor 108 is turned off (Vg_P is logic 1), transistor 100 is turned on (Vg_N is logic 1). $I_L$ represents the load current flowing in inductor 112.

Figure 2:
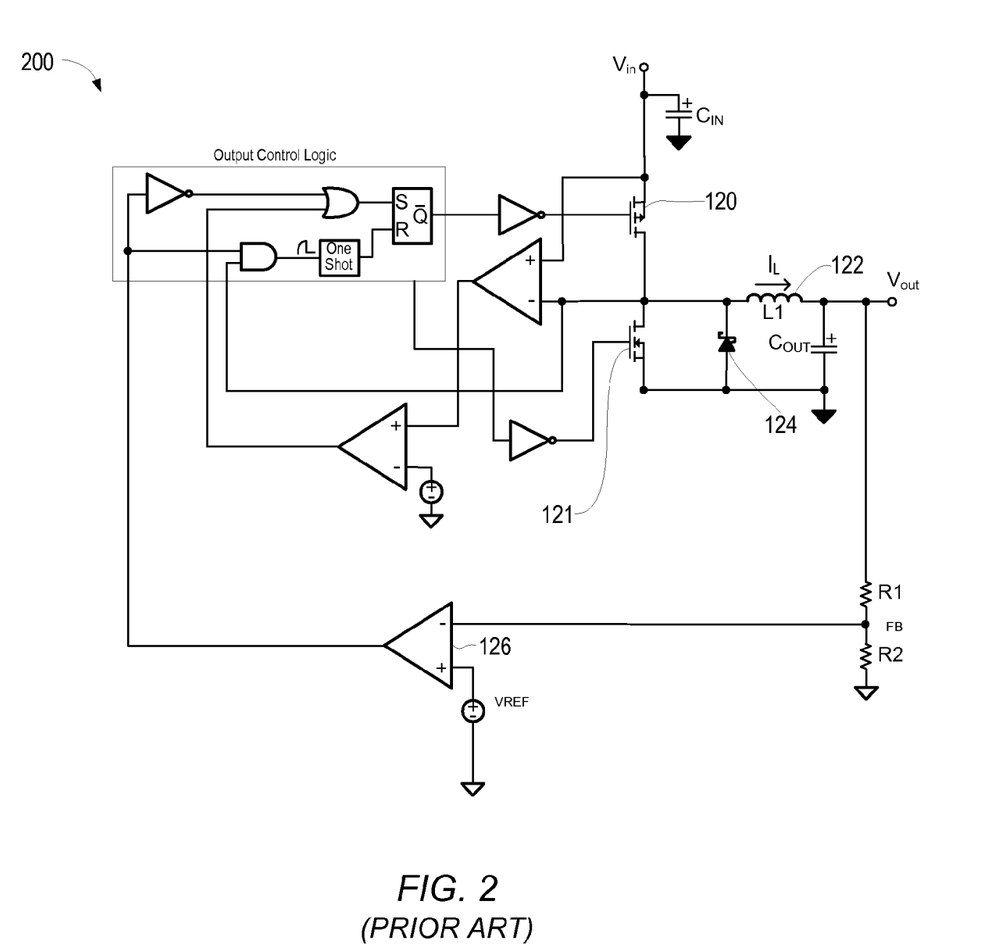
FIG. 2 is a simplified functional diagram of the Micrel MIC2177 switching DC-to-DC power converter configured to operate in PFM according to prior art.

In addition to operating in PWM mode, Buck regulator 100, and other regulators, may also be configured to operate in PFM (pulse-frequency mode—also known as skip mode). One example of a synchronous buck regulator that can operate in both modes is the Micrel MIC2177. FIG. 2 shows a simplified functional diagram of the MIC2177 configured to operate in PFM. During PFM operation of regulator circuit 200 the output P-channel device 120 is turned on at a frequency and duty cycle that is a function of VIN, VOUT, and the value L1 of inductor 122. While in PFM, the N-channel device 121 coupled to P-channel device 120 is kept turned off to optimize efficiency by reducing gate charge dissipation. VOUT is regulated by skipping switching cycles that turn on P-channel device 120. Comparator 126 regulates VOUT by controlling when regulator circuit 200 skips cycles. It compares the voltage at node FB (VFB) to the reference voltage (VREF) and has 10 mV of hysteresis to prevent oscillations in the control loop. When VFB is less than VREF−5 mV, the output of comparator 126 is logic 1, allowing P-channel device 120 to turn on. Conversely, when VFB is greater than VREF+5 mV, P-channel device 120 is turned off. Although regulator circuit 200 operates in PFM, it requires external "catch" diode 124 for its operation, which increases the cost of building a regulator using regulator circuit 200.

Many other problems and disadvantages of the prior art will become apparent to one skilled in the art after comparing such prior art with the present invention as described herein.

SUMMARY OF THE INVENTION

In one set of embodiments, a switching power regulator for performing DC-to-DC (DC-DC) conversion may operate in pulse-frequency mode (PFM) based on peak current sense to regulate the load current with a variable frequency to achieve high efficiency at wide load variation without requiring an external diode component.

A PFM DC-DC voltage regulator may include an inductor and a load capacitor both coupled to a node configured as the regulator voltage output $V_{out}$. A voltage divider circuit comprising two resistors may be configured to provide an attenuated, or divided down, version of $V_{out}$ at a second node (FB). The regulator may include two power transistors—a PMOS device and an NMOS device whose channels (drain terminals) may be coupled in series at a node (LX) between a supply voltage AVDD and a signal reference voltage AVSS—, an inverter configured to drive the gate of the PMOS device, an inverter configured to drive the gate of the NMOS device, and control circuitry for controlling the PMOS and NMOS devices. The control circuitry may include a zero-crossing comparator, a skip-mode comparator, a peak-current comparator, and additional logic circuitry comprising a one-shot pulse generator, a delay element, and respective SR latches for controlling the gate of each corresponding transistor.

In one set of embodiments, the skip-mode comparator may sense $V_{out}$ and control the switching of the output power transistors to ramp the output voltage between a specified value $V_{out}$, ±5%. If the value of $V_{out}$ falls below the 'high' threshold of the skip-mode comparator, the PMOS transistor may be turned on. The PMOS transistor may remain turned on until $V_{out}$ reaches the 'high' threshold of the skip-mode comparator or until the peak load (or inductor) current exceeds a specified current level set for PFM. Once the PMOS transistor is turned off, an SR latch whose output is configured to partially control the gate of the NMOS device may be set until the inductor current ramps to zero. The zero-crossing comparator may be configured to sense what the polarity of the voltage at node LX is with respect to AVSS. When the voltage at node LX switches from a negative value to a positive value with respect to AVSS, the NMOS transistor may be turned off to prevent simultaneous reverse current flow in the inductor. When the value of $V_{out}$ falls below the 'high' threshold of the skip-mode comparator, the PMOS transistor may be turned on again, and the entire switching cycle (PMOS/NMOS) may be repeated—to store charge on the capacitor—until $V_{out}$ reaches the desired level corresponding to the 'high' threshold of the skip-mode comparator. At that point the NMOS device may be briefly turned on to ramp the current in the inductor to zero, following which the PMOS transistor and the NMOS transistor may both be turned off to enter an extremely low power mode.

Should the load current increase when, as a result of operating in PFM, $V_{out}$ falls below the 'low' threshold of the skip mode comparator, the power regulator may automatically transition into fixed-frequency PWM mode. During PFM operation, the PMOS transistor may be turned on at a frequency and duty cycle (for PWM) that is a function of the power regulator input voltage, the power regulator output voltage, and the value of the inductor, and the NMOS transistor may be kept off to optimize efficiency by reducing gate charge dissipation. The output voltage of the power regulator may therefore be regulated by skipping switching cycles that turn on the PMOS transistor.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."

DETAILED DESCRIPTION OF THE PREFERRED EMBODIMENTS

Figure 3:
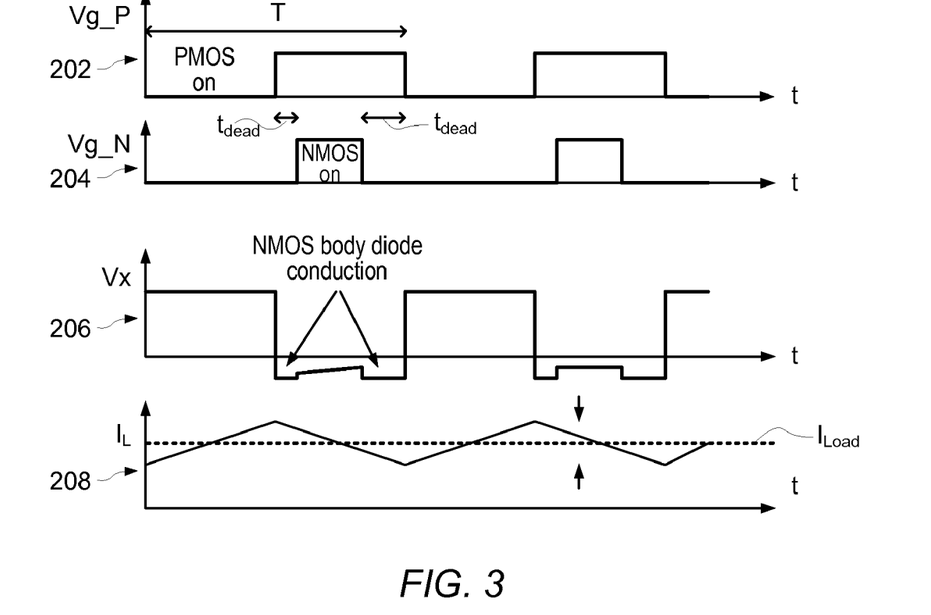
FIG. 3 is a timing diagram of voltage signals Vg_P, Vg_N, and Vx, and inductor current $I_L$ observed during high current load operation of a DC-to-DC converter.
Figure 4:
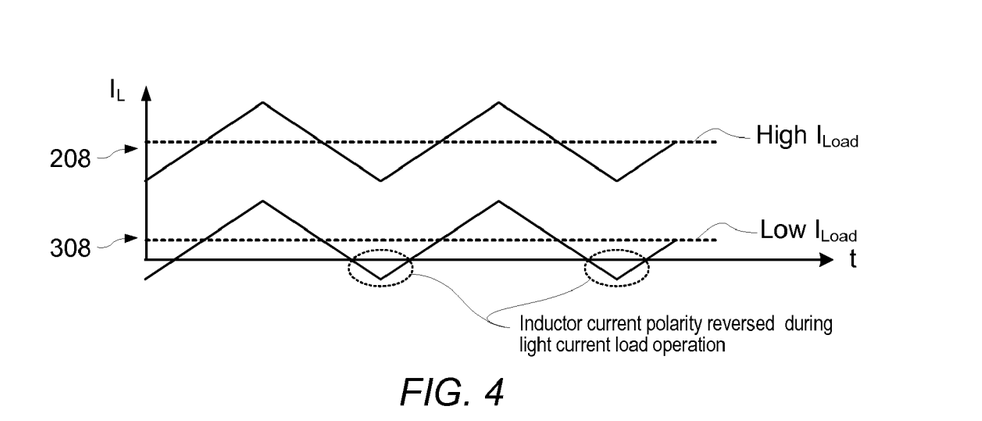
FIG. 4 is a timing diagram of inductor current $I_L$ observed during light current load operation of a DC-to-DC converter, with the inductor operating in a continuous conduction mode (CCM) by reversing the polarity of $I_L$.

Referring again to FIG. 1, operation of a synchronous buck converter may be further examined. FIG. 3 shows voltage waveforms Vg_P 202, Vg_N 204, and Vx 206 (voltage at node LX), as well as inductor current $I_L$ 208 and corresponding load current $I_{Load}$ as observed during high current load operation of synchronous buck converter 100. When Vg_P 202 is logic low, transistor 108 is turned on. When Vg_N is logic high, transistor 110 is turned on. The deadtime delay $t_{dead}$ indicates the time period when both transistors are turned off. As shown in FIG. 3, the average inductor current (i.e. the average of $I_L$) is essentially equal to the DC load current provided by converter 100, indicated in FIG. 3 as $I_{Load}$. FIG. 4 shows a timing diagram of the inductor current (and correspondingly the DC load current) observed during light current load operation of converter 100. As seen in FIG. 4, when $I_{Load}$ is less than half the magnitude of the peak-to-peak ripple of current $I_L$, the entire $I_L$ waveform 208 may be shifted down, shown as $I_L$ waveform 308 in FIG. 4. It should be noted that in an asynchronous buck converter, during light current load operation, inductor current $I_L$ may go to zero due to the effects of a the rectifier diode that may be coupled across the load, resulting in inductor 112 operating in discontinuous conduction mode (DCM). In converter 100, during light current load operation, inductor 112 may operate in a continuous conduction mode (CCM) by reversing the polarity of inductor current $I_L$, as illustrated in $I_L$ waveform 308 in FIG. 4.

Figure 5:
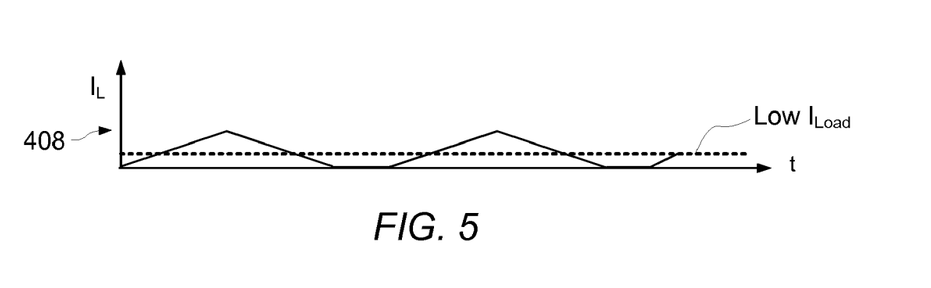
FIG. 5 is a timing diagram of inductor current $I_L$ observed during light current load operation of a DC-to-DC converter, with the inductor operating in a discontinuous conduction mode (DCM)

CCM operation at light current loads may be undesirable, as the reversal of the polarity of the inductor current $I_L$ may contribute to conduction losses—because of the inductor current flowing from capacitor 114 to ground—without contributing to the output load current ($I_{Load}$). DCM in a synchronous regulator during low current load operation may be achieved by disabling N-channel device 110 at the zero-crossing point of the inductor current $I_L$. The resulting inductor current $I_L$ waveform 408 is shown in FIG. 5. As a result of N-channel device 110 being turned off at the zero-crossing point, inductor 112 does not conduct reverse current, hence $I_L$ 408 only flows in one direction. In other words, in DCM the inductor current $I_L$ may remain positive. However, during low current load operation in DCM, the duty cycle of the inductor current $I_L$ may be significantly lower than during CCM, which may affect the efficiency of power regulator 100.

Figure 6:
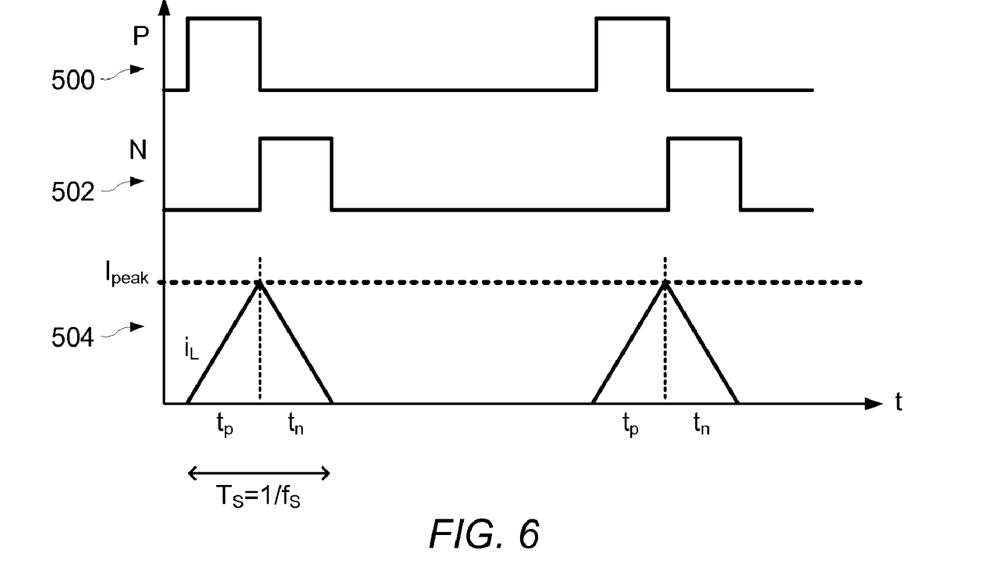
FIG. 6 shows the inductor current $I_L$ waveform during variable frequency pulse-frequency mode (PFM) operation.

In contrast to PWM mode, the PFM low power mode is based on the idea of reducing the switching frequency proportionally to the load current $I_{Load}$. By making the switching frequency proportional to the load current, high efficiency may be maintained over a wide range of load currents. FIG. 6 shows the PFM waveforms as relating, for example, to the operation of regulator circuit 200 shown in FIG. 2. Waveforms 500 and 502 indicate when P-channel device 120 and N-channel device 121 are turned on, respectively. Waveform 504 is the inductor current that may be conducted by inductor 122. If $t_p$ and $t_n$ represent the on times for P-channel device 120 and N-channel device 121, respectively, then:

$$t_p = \frac{LI_{peak}}{V_{in} - V_{out}}, \text{ and} \quad (1)$$

$$t_n = \frac{LI_{peak}}{V_{out}}, \quad (2)$$

where L is the inductance of inductor 122, $V_{in}$ is the input voltage to regulator circuit 200 (referring to FIG. 2), $V_{out}$ is the output voltage of regulator circuit 200 (again, referring to FIG. 2), and $I_{peak}$ is the peak value of current $I_L$ conducted by inductor 122. Consequently, $I_{Load}$ may be expressed as:

$$I_{Load} = \frac{1}{2} I_{peak} (t_p + t_n) \cdot f_s, \quad (3)$$

where $f_s$ is the switching frequency defined as:

$$f_s = \frac{1}{t_p + t_n}. \quad (4)$$

Combining equations 1-4, the switching frequency may be written as:

$$f_s = \frac{2V_o I_{Load}}{LI_{peak}^2}\left(1 - \frac{V_o}{V_i}\right). \quad (5)$$

As equation 5 indicates, the switching frequency is proportional to the load current. The output voltage ripple in PFM may therefore be expressed as:

$$(2\Delta V) \approx \frac{1}{2C}I_{peak}(t_p + t_n) = \frac{LI_{peak}^2}{2C} \cdot \frac{V_{in}}{V_{out}(V_{out} - V_{in})}, \quad (6)$$

indicating a higher voltage ripple than what may be observed in PWM mode.

Figure 7:
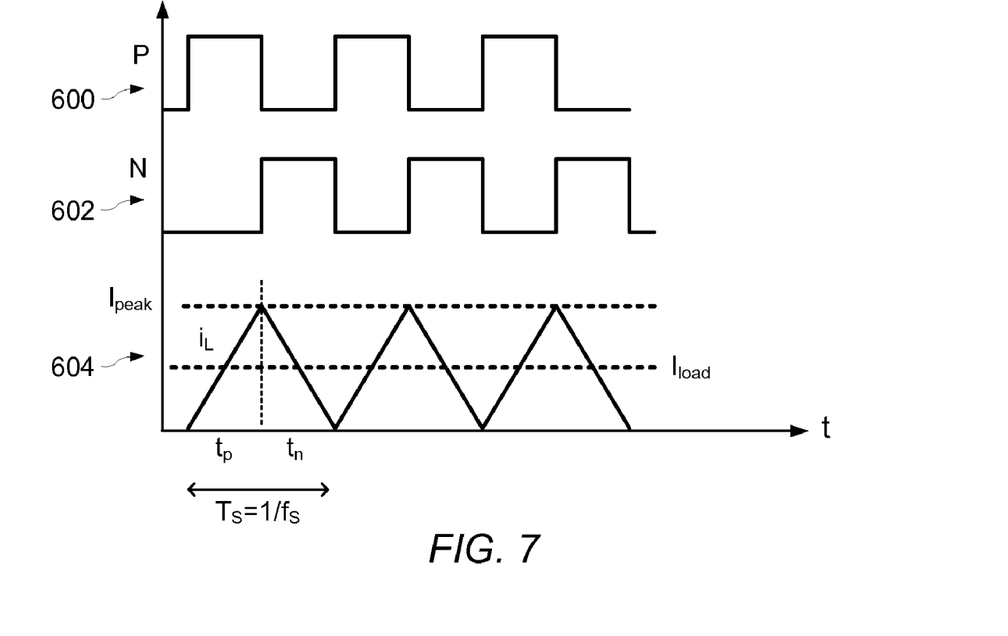
FIG. 7 shows the inductor current $I_L$ waveform during maximum load/frequency PFM operation.

Turning now to FIG. 7, the PFM waveforms as relating, for example, to the operation of regulator circuit 200 during maximum load current/frequency operation are shown. Waveforms 600 and 602 indicate when P-channel device 120 and N-channel device 121 are turned on, respectively. Waveform 604 is the inductor current that may be conducted by inductor 122. The maximum load current may be expressed as:

$$I_{\text{Load\_max},PFM} = \frac{1}{2}I_{peak}, \quad (7)$$

with the corresponding switching frequency:

$$f_s = \frac{2V_{out}}{LI_{peak}}\left(1 - \frac{V_{out}}{V_{in}}\right). \quad (8)$$

The conduction losses in PMOS device 120, NMOS device 121 and inductor 122 during PFM operation may be expressed as:

$$P_{Cond\_PFM} = R_{on\_p}i_{p\_RMS}^2 + R_{on\_n}i_{n\_RMS}^2 + R_L I_{L\_RMS}^2, \quad (9)$$

where $R_{on\_p}$ and $R_{on\_n}$ correspond to the on resistances of PMOS device 120 and NMOS device, respectively, $i_{p\_RMS}$ and $i_{n\_RMS}$ correspond to the RMS currents conducted by PMOS device 120 and NMOS device, respectively, $R_L$ corresponds to the impedance of inductor 122, and $I_{L\_RMS}$ corresponds to the RMS current conducted by inductor 122. Equation 9 may be re-written in terms of $V_{in}$, $V_{out}$, and $I_{peak}$:

$$P_{Cond\_PFM} = \frac{LI_{peak}^3}{3}\left(\frac{R_{on\_p}}{V_{in} - V_{out}} + \frac{R_{on\_n}}{V_{out}} + \frac{R_L V_{in}}{(V_{in} - V_{out})V_{out}}\right) \cdot f_s. \quad (10)$$

Combining equations 10 and 5, the conduction losses may be expressed as:

$$P_{Cond,PFM} = \frac{2}{3}I_{Load}I_{peak}\left[R_{on\_p} \cdot \frac{V_{out}}{V_{in}} + R_{on\_n}\left(1 - \frac{V_{out}}{V_{in}}\right) + R_L\right], \quad (11)$$

indicating that the conduction losses during PFM operation may be directly proportional to the load current.

Figure 8:
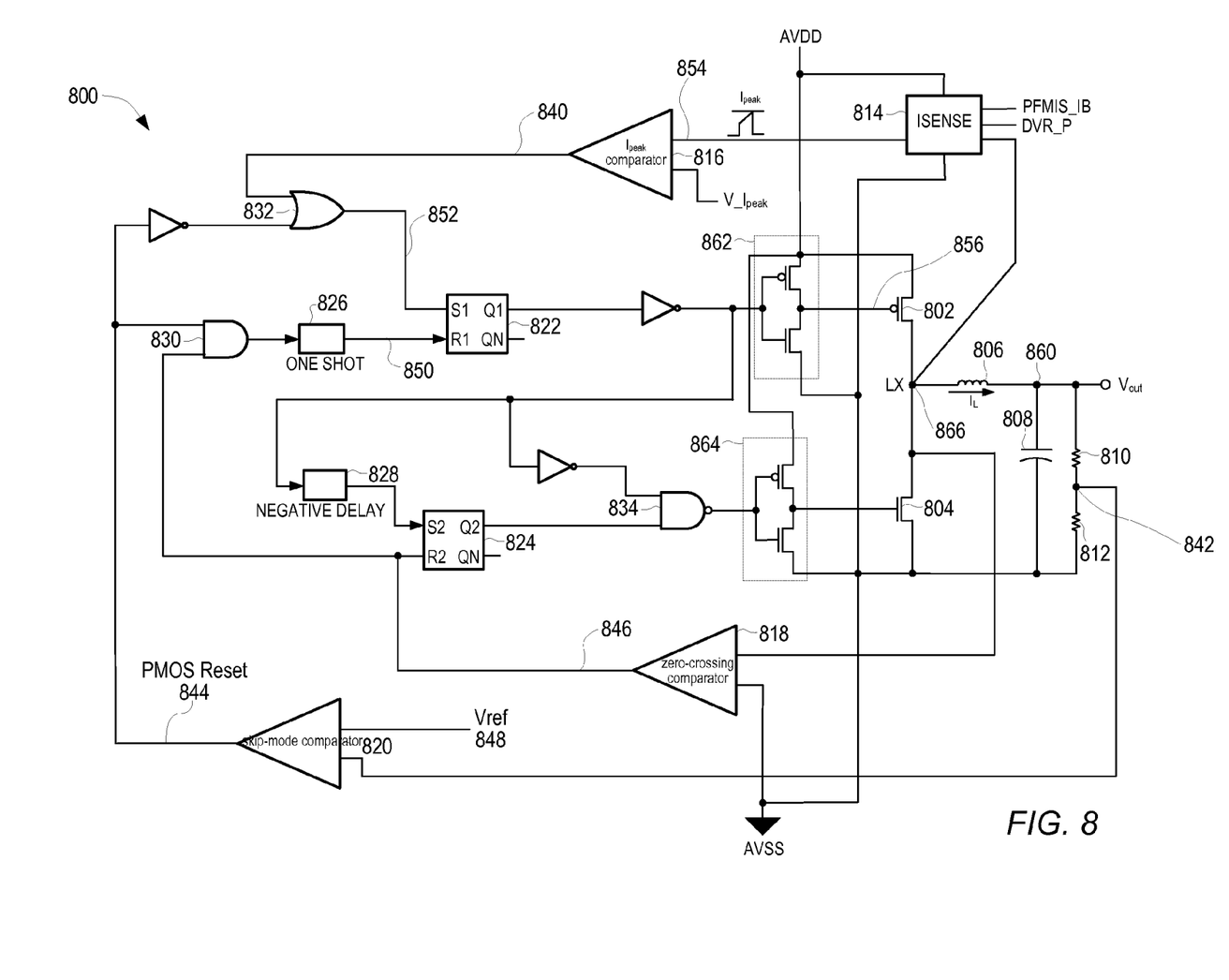
FIG. 8 is a circuit diagram of a PFM DC-to-DC voltage regulator configured according to one embodiment of the present invention.

FIG. 8 is a partial circuit diagram of a PFM DC-to-DC voltage regulator 800 configured according to one embodiment of the present invention. Regulator 800 may include an inductor 806 and a load capacitor 808 both coupled to node 860, which may be configured as the output of regulator 800, generating output voltage $V_{out}$. A voltage divider circuit comprising resistors 810 and 812 may be configured to provide an attenuated, or divided down, version of $V_{out}$ at node 842. Regulator 800 may also include two power transistors, PMOS device 802 and NMOS device 804, whose channels (drain terminals) may be coupled in series between supply voltage AVDD and signal reference voltage AVSS (which may be ground in one set of embodiments), inverter 862 configured to drive the gate of PMOS device 802, inverter 864 configured to drive the gate of NMOS device 804, and control circuitry for controlling PMOS device 802 and NMOS device 804. The control circuitry for PMOS device 802 and NMOS device 804 may include comparator 818 (zero-crossing comparator), comparator 820 (skip-mode comparator), comparator 816 ($I_{peak}$ comparator), and additional logic circuitry comprising one-shot pulse generator 826, delay element 828, and control latches 822 and 824, as well as logic gates 832, 830, and 834. Alternate embodiments using transistor devices other than PMOS device 802 and NMOS device 804 are possible and are contemplated.

According to one mode of operation of regulator 800, comparator 820 may sense $V_{out}$ (via node 842), and control the switching of output devices 802 and 804 to ramp the output voltage between specified value $V_{out}\pm$a specified margin, which may be 5% in one set of embodiments. If $V_{out}$ falls below the "high" threshold of comparator 820, PMOS device 802 may be turned on. PMOS device 802 may remain turned on until $V_{out}$ reaches the "high" threshold of comparator 820 or until the peak current $I_{peak}$ exceeds a specified current level set for PFM ($I_{PFM}$). In one set of embodiments, $I_{PFM}$ may be set to equal $I_{Load}+I_{PK}$. Once PMOS device 802 is turned off, SR latch 824 may be set (turned on) until the inductor current (conducted by inductor 806) ramps to zero. Comparator 818 may be configured to sense the polarity of the voltage developed at node 866, in effect detecting an NMOS zero-current condition. When the voltage at node 866 switches from a negative value to a positive value, NMOS device 804 may be turned off to prevent simultaneous reverse current flow in inductor 806. When the value $V_{out}$ falls below the "high" threshold of comparator 820, PMOS device 802 may be turned on again, and the entire switching cycle (PMOS/NMOS) may be repeated—to store charge on capacitor 808—until $V_{out}$ reaches the desired "high" level corresponding to the "high" threshold of comparator 820. At that point NMOS device 804 may be briefly turned on to ramp the current in inductor 806 to zero, following which PMOS device 802 and NMOS device 804 may both be turned off to enter an extremely low power mode.

Should the load current increase when, as a result of operating in PFM, $V_{out}$ falls below the "low" threshold of comparator 820—about 50 mV below the nominal voltage in one set of embodiments—regulator 800 may automatically transition into fixed-frequency PWM mode. It should be noted that additional circuit elements may be required for the fixed-frequency PWM operating mode of regulator 800, and that such additional components are not shown in FIG. 8 in order to better highlight the PFM operation of regulator 800. Such additional circuit components and their operation in the context of the PWM operating mode of power regulators is well known to those skilled in the art. As previously mentioned, during PFM operation PMOS device 802 may be turned on at a frequency and duty cycle (for PWM) that is a function of $V_{in}$, $V_{out}$, and the value of inductor 806, and NMOS device 804 may be kept off to optimize efficiency by reducing gate charge dissipation. $V_{out}$ may therefore be regulated by skipping switching cycles that turn on PMOS device 802.

The PFM operation of regulator 800 according to one embodiment will now be discussed in more detail. Beginning with an initial state in which PMOS device 802 and NMOS device 804 are turned off, the voltage at node 866, which may be roughly equivalent to $V_{out}$, will be greater than zero, resulting in output 846 of comparator 818 being asserted (that is, being logic high). Consequently, capacitor 808 may discharge, and $V_{out}$ may drop down from its nominal value. The divided voltage at node 842 may fall below the value of reference voltage 848, resulting in output 844 of comparator 820 being logic high. With outputs 844 and 846 both being logic high, the output of NAND gate 830 will be logic high, enabling one-shot pulse generator 826 to generate a trigger pulse at output 850, which may reset output Q1 of SR latch 822 to logic low, thereby turning on PMOS device 802 and causing current $I_L$ in inductor 806 to increase linearly until it reaches a pre-set current limit (for example, $I_{PFM}$ as previously shown, which may be 80 mA in one set of embodiments). Current-sense block 814—coupled to node 866—may operate to sense $I_L$, and generate a corresponding voltage value at output 854.

When current $I_L$ in inductor 806 increases and reaches the pre-set current limit, output 840 of comparator 816 may assert in response to output 854 of current-sense block 814, setting output Q1 of SR latch 822 to logic high, thereby turning off PMOS device 802. There is a deadtime during which both PMOS device 802 and NMOS device 804 are turned off, forcing the body-diode of NMOS device 804 to turn on (forward-biased) and pick up current $I_L$ from inductor 806. Accordingly, the voltage at node 866 may swing below ground (−0.6V in one set of embodiments), resulting in output 846 of comparator 818 going to logic low, providing a logic low input to input S2 of SR latch 824. The inverted output of SR latch 822 may also be coupled to delay element 828, which may operate to keep input S2 of SR latch 824 at logic high for a specified additional delay period, such that input S2 of SR latch 824 is still high for a brief period after the voltage at node 866 falls below ground, even though output Q1 of SR latch 822 is now at logic high. The high S2 input and low R2 input of SR latch 824 may combine to set output Q2 of SR latch 824 to logic high. With output Q1 of SR latch 822 and output Q2 of SR latch 824 both being logic high, NMOS device 804 may be turned on to ramp down inductor current $I_L$ to zero. When $I_L$ crosses zero, reversing its direction, the voltage at node 866 may switch from a negative value to a positive value, setting output 846 of comparator 818 to logic high, which in turn may reset output Q2 of SR latch 824 to logic low. In addition, when the voltage at node 842 is still lower than reference voltage 848, output signal 844 of comparator 820 will be at logic high, which, combined with input R2 of SR latch 824 going to logic high, will result in the output of AND gate 830 triggering one-shot pulse generator 826, thereby resetting output Q1 of SR latch 822 to logic low. This may result in PMOS device 802 being turned on, beginning another switching cycle.

When inductor current $I_L$ reaches ground, comparator 818 may operate to turn off NMOS device 804. There may be some noise present at ground as the comparator switches NMOS device 804 on and off. SR latch 824 may be used to control the gate of NMOS device 804 to turn NMOS device 804 off. As the voltage at node 856 goes to logic high to turn off PMOS device 802, the output of delay element 828 may remain at logic high for a specified delay period before going to logic low. Once both inputs S2 and R2 of SR latch 824 at logic low, output Q2 of SR latch 824 may still hold its current value, leaving NMOS device turned on. If the voltage at node 842 is higher than reference voltage 848, (that is, capacitor 808 is fully charged), then PMOS reset 844 may be logic low, and when NMOS device 804 is turned off because input R2 of SR latch 824 is logic high, the combination of PMOS reset 844 being logic low and input R2 of SR latch 824 being logic high results in the input of one-shot pulse generator 826 remaining logic low and not resetting SR latch 822, thereby not turning on PMOS device 802. Therefore, when $V_{out}$ is fully restored (that is, the voltage at node 842 is greater than reference voltage 848), PMOS device 802 and NMOS device 804 may both be turned off.

In general, comparator 820 may regulate $V_{out}$ by controlling when regulator 800 skips cycles, comparing the voltage at node 842 to reference voltage 848, with built in hysteresis, which may be 20 mV in one set of embodiments, to prevent oscillation in the feedback control loop. When the voltage at node 842 is less than reference voltage 848 minus a preset value (10 mV in one set of embodiments), output 844 of comparator 820 (in essence, PMOS reset signal 844) may be at logic high, turning on PMOS device 802 as discussed above. Conversely, when the voltage at node 842 is greater than reference voltage 848, PMOS device 802 may be turned off.

The control of PMOS device 802 may be thus be summarized as follows. Through OR gate 832, PMOS device 802 may be turned off if either or both of two conditions are met. The first condition is met when the current $(I_L)$ sensed by current-sense block 814 reaches the $I_{peak}$ limit, and the second condition is met when the voltage at node 842 exceeds the value of reference voltage 848. Through AND gate 830, PMOS device 802 may be turned on if both of two conditions are met. The first condition is met when the voltage at node 842 falls below the value of reference voltage 848, and the second condition is met when the voltage at node 866 exceeds ground level.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A power regulator comprising:
   a first node, wherein a first voltage developed at the first node is used to produce an output voltage of the power regulator;

a first transistor having a control terminal, wherein the first transistor is coupled between a first supply voltage and the first node, wherein the first transistor is operable to supply current to the first node when the first transistor is conductive;

a second transistor having a control terminal, wherein the second transistor is coupled between the first node and a second supply voltage; and a control circuit coupled to the control terminal of the first transistor and to the control terminal of the second transistor, wherein the control circuit is operable to sense the current, sense the output voltage, sense a polarity of the first voltage, and turn the first transistor and the second transistor on and/or off responsive to at least the current, the output voltage, and the polarity of the first voltage.

2. The power regulator of claim 1, further comprising:

a first driver circuit coupled between the control circuit and the control terminal of the first transistor, and operable to enable the first transistor to be conductive and/or non-conductive; and a second driver circuit coupled between the control circuit and the control terminal of the second transistor, and operable to enable the second transistor to be conductive and/or non-conductive.

3. The power regulator of claim 1, wherein the control circuit is operable to turn off the first transistor if:

a value of the current reaches a specified current limit; and/or a divided-down version of the output voltage exceeds a value of a reference voltage.

4. The power regulator of claim 1, wherein the control circuit is operable to turn on the first transistor if:

a divided-down version of the output voltage falls below a value of a reference voltage; and the polarity of the first voltage is positive with respect to the second supply voltage.

5. The power regulator of claim 1, wherein the control circuit is operable to:

turn on the second transistor after the first transistor is turned off and the first voltage becomes negative with respect to the second supply voltage; and turn off the second transistor when the first voltage becomes positive with respect to the second supply voltage.

6. The power regulator of claim 1, wherein the control circuit comprises:

a current-sense circuit operable to sense the current and generate a current-sense output value corresponding to the current; and a first comparator having an output and operable to compare the current-sense output value against a first reference value corresponding to a specified current, wherein the output of the first comparator is indicative of whether the inductor current is greater than or equal to, or less than the specified current;

wherein the control circuit is operable to turn off the first transistor responsive to the output of the first comparator indicating that the inductor current is greater than or equal to the specified current.

7. The power regulator of claim 1, wherein the control circuit comprises a second comparator having an output and operable to compare a first input value corresponding to the output voltage against a second input value corresponding to a reference voltage, wherein the output of the second comparator is indicative of whether the first input value is greater than, or less than or equal to the reference voltage;

wherein the control circuit is operable to turn off the first transistor responsive to the output of the second comparator indicating that the first input value is greater than the reference voltage.

8. The power regulator of claim 1, wherein the control circuit comprises a third comparator having an output and operable to compare the first voltage against the second supply voltage, wherein the output of the third comparator is indicative of whether the first voltage is greater than, or less than or equal to the second supply voltage;

wherein the control circuit is operable to turn on the second transistor responsive in part to the output of the third comparator indicating that the first voltage is less than the second supply voltage.

9. A method for controlling a first transistor and a second transistor configured to generate an output voltage of a power regulator, the method comprising:

turning on the first transistor when the output voltage falls below a reference voltage and a polarity of the output voltage remains positive with respect to a first supply voltage;

turning off the first transistor when a load current generated in conjunction with the output voltage reaches a specified value or when the output voltage exceeds the reference voltage; and turning on the second transistor following said turning off the first transistor if the polarity of the output voltage becomes negative with respect to the first supply voltage.

10. The method of claim 9, further comprising turning off the second transistor when the polarity of the output voltage becomes positive with respect to the first supply voltage.

11. The method of claim 9;

wherein said turning off the first transistor comprises asserting a first control signal operative to turn off the first transistor;

wherein the method further comprises delaying the first control signal by a delay time greater than a time elapsed between said turning off the first transistor and the polarity of the output voltage becoming negative with respect to the first supply voltage; and wherein said turning on the second transistor comprises asserting a second control signal operative to turn on the second transistor, wherein said asserting the second control signal is based on the delayed first control signal.

12. A power regulator comprising:

an inductor having two ends and configured to provide an output voltage of the power regulator at one end of the inductor;

a first transistor having a control terminal, wherein the first transistor is coupled between a first supply voltage and the other end of the inductor, wherein the first transistor is operable develop a current in the inductor when the first transistor is conductive;

a second transistor having a control terminal, wherein the second transistor is coupled between the other end of the inductor and a second supply voltage; and a control circuit coupled to the control terminal of the first transistor and to the control terminal of the second transistor, wherein the control circuit is operable to sense the current in the inductor, sense an attenuated version of the output voltage, sense a polarity of a first voltage developed at the other end of the inductor, and turn the first transistor and the second transistor on and/or off responsive to at least the current in the inductor, the attenuated version of the output voltage, and the polarity of the first voltage.

13. The power regulator of claim 12, further comprising an output capacitance coupled between the one end of the inductor and the second supply voltage.

14. The power regulator of claim 12, further comprising first and second resistors configured as a voltage divider circuit coupled between the one end of the inductor and the second supply voltage, and operable to provide the attenuated version of the output voltage.

15. The power regulator of claim 12, wherein the control circuit comprises:
   a current-sense circuit operable to sense the current in the inductor and generate a current-sense voltage corresponding to the current in the inductor; and
   a peak-current comparator having an output and operable to compare the current-sense voltage against a peak-current voltage corresponding to a specified peak-current value, wherein the output of the peak-current comparator is indicative of whether the current-sense voltage is greater than or equal to, or less than the peak-current voltage;
   a skip-mode comparator having an output and operable to compare the attenuated version of the output voltage against a reference voltage, wherein the output of the skip-mode comparator is indicative of whether the attenuated version of the output voltage is greater than, or less than or equal to the reference voltage; and
   a zero-crossing comparator having an output and operable to compare the first voltage against the second supply voltage, wherein the output of the zero-crossing comparator is indicative of whether the first voltage is greater than, or less than or equal to the second supply voltage;
   wherein the control circuit is operable to turn off the first transistor responsive to the output of the peak-current comparator indicating that the current-sense voltage is greater than or equal to the peak-current voltage;
   wherein the control circuit is operable to turn off the first transistor responsive to the output of the skip-mode comparator indicating that the attenuated version of the output voltage is greater than the reference voltage; and
   wherein the control circuit is operable to turn on the second transistor responsive in part to the output of the zero-crossing comparator indicating that the first voltage is less than the second supply voltage.

16. The power regulator of claim 15, wherein the skip-mode comparator has built-in hysteresis.

17. The power regulator of claim 15, wherein the control circuit further comprises:
   a first set-reset (SR) latch having an output coupled to the control terminal of the first transistor;
   a first logic gate having an output coupled to a set (S) input of the first SR latch and configured to OR the peak-comparator output with an inverted version of the output of the skip-mode comparator;
   a one-shot pulse generator having an input and having an output coupled to a reset (R) input of the first SR latch; and
   a second logic gate having an output coupled to the input of the one-shot pulse generator and configured to AND the output of the zero-crossing comparator with the output of the skip-mode comparator.

18. The power regulator of claim 17, wherein the control circuit further comprises:
   a second SR latch having an R input coupled to the output of the zero-crossing comparator;
   a third logic gate having an output coupled to the control terminal of the second transistor and configured to AND the output of the first SR latch with the output of the second SR latch; and
   a delay element having an input coupled to an inverted version of the output of the first SR latch and having an output coupled to the S input of the second SR latch.

* * * * *